(12) United States Patent
Brame et al.

(10) Patent No.: US 11,772,418 B2
(45) Date of Patent: *Oct. 3, 2023

(54) WHEEL

(71) Applicant: Moveero Limited, Hadley (GB)

(72) Inventors: Gianpietro Brame, Redditch (GB); Kristoffer Eriksen, Redditch (GB); Ulla Bennetzen, Redditch (GB); John Madsen, Redditch (GB)

(73) Assignee: Moveero Limited, Telford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,530

(22) Filed: Mar. 31, 2020

(65) Prior Publication Data

US 2020/0223253 A1    Jul. 16, 2020

Related U.S. Application Data

(63) Continuation of application No. 15/577,411, filed as application No. PCT/GB2016/051577 on May 31, 2016, now Pat. No. 10,639,930.

(51) Int. Cl.
| | | |
|---|---|---|
| *B60B 21/02* | (2006.01) | |
| *B60B 21/10* | (2006.01) | |
| *B60B 3/04* | (2006.01) | |

(52) U.S. Cl.
CPC .............. *B60B 21/026* (2013.01); *B60B 3/04* (2013.01); *B60B 21/028* (2013.01);
(Continued)

(58) Field of Classification Search
CPC ... B60B 21/026; B60B 21/028; B60B 21/102; B60B 21/104; B60B 21/02; B60B 21/04;
(Continued)

(56) References Cited

U.S. PATENT DOCUMENTS 1,718,874 A    6/1929   Dunlop
2,950,142 A *  8/1960   Albert ................... F16F 15/324
                                                301/5.21
(Continued)

FOREIGN PATENT DOCUMENTS

CN    101287614    10/2008
CN    102245398    11/2011
(Continued)

OTHER PUBLICATIONS

GKN Land Systems, Wheels Brochure "Profit-fit Wheels", http://www.gkn.com/wheels/media/Brochures/Downloads/GKN_Wheels_brochure_Profit-fit_wheels.pdf, Jan. 29, 2012.
(Continued)

*Primary Examiner* — Scott A Browne
(74) *Attorney, Agent, or Firm* — Boyle Fredrickson, S.C.

(57) ABSTRACT

A wheel includes a rim having inner and outer flanges. A first end of each flange is positioned axially outwardly relative to the second end. A pair of bead seats are positioned one adjacent each flange, and each has an axially outer end connected to a second end of its flange by a flange connecting portion, and an axially inner end connected to one of a pair of side parts. Each side part is positioned between a central well and one of the inner and outer flanges, and connected to the well by a well connecting portion. The outer end of each bead seat is positioned radially outwardly relative to bead seat inner end. At least one of the flanges includes an extended portion which extends radially inwardly, such that a free end of the extended portion is positioned radially inwardly relative to the first end of the respective flange.

20 Claims, 3 Drawing Sheets

(52) U.S. Cl.
CPC .......... *B60B 21/102* (2013.01); *B60B 21/104* (2013.01); *B60B 3/041* (2013.01); *B60B 2900/212* (2013.01); *B60B 2900/311* (2013.01); *B60B 2900/331* (2013.01); *B60B 2900/521* (2013.01); *B60B 2900/711* (2013.01)

(58) Field of Classification Search
CPC ......... B60B 2900/212; B60B 2900/311; B60B 2900/331; B60B 2900/521; B60B 2900/711; B60B 3/04; B60B 3/041
See application file for complete search history.

(56) References Cited

U.S. PATENT DOCUMENTS

| | | | |
|---|---|---|---|
| 3,462,917 | A | 8/1969 | Bajer |
| 4,940,069 | A | 7/1990 | Nakasaki et al. |
| 6,474,385 | B1 | 11/2002 | Bonning et al. |
| 6,644,756 | B1 | 11/2003 | Handa et al. |
| 2007/0245562 | A1 | 10/2007 | Malevergne |
| 2009/0223614 | A1 | 9/2009 | Jensen |
| 2011/0298271 | A1 | 12/2011 | Cragg |
| 2016/0167427 | A1* | 6/2016 | Jensen .................... B60B 21/02 301/95.101 |

FOREIGN PATENT DOCUMENTS

| | | |
|---|---|---|
| EP | 2106927 A1 | 7/2009 |
| EP | 2193931 | 6/2010 |
| GB | 2121738 | 3/1987 |
| GB | 2431141 | 4/2007 |

OTHER PUBLICATIONS

CN 201680045794.0, Second Office Action, dated Dec. 28, 2020, 4 pages and English Translation (1 page).
EP16726417.5 Examination Report dated Aug. 28, 2020, 4 pages.
EP16726417.5 Examination Report dated Jan. 3, 2020, 4 pages.
GB1509724.9 Examination Report, dated May 20, 2020, 5 pages.
CN201680045794.0 First Office Action, dated Mar. 20, 2020, 4 pages and English translation (6 pages).
16 726 417.5-1012, Examination Report, dated Mar. 27, 2023, 11 pages.

* cited by examiner

WHEEL

CROSS-REFERENCE TO RELATED APPLICATIONS

This application is a continuation of U.S. application Ser. No. 15/577,411, filed Nov. 28, 2017, which is a 371 of PCT/GB2016/051577, filed May 31, 2016.

DESCRIPTION OF INVENTION

This invention relates to a wheel construction, in particular, but not exclusively to a wheel construction for agricultural vehicles or construction machines and the like.

Wheel constructions for agricultural vehicles and some other off-road vehicles, are known which include a substantially circular rim having axially inner and axially outer flanges, each of which is positioned adjacent a respective bead seat, which provides a seat for a tyre bead of a tyre, which is fitted to a radially outer or "tyre side" of the rim. Such wheel constructions typically also include a disc which is connected to a radially inner side of the rim. The disc enables the wheel to be securable to a hub of a vehicle, for example by the use of bolts. The rim and the disc may be separable from one another, or may be permanently joined to one another, for example by welding.

The disc is connected to the rim in a central portion or 'well' of the rim. The well is positioned between the inner and outer flanges, and may be positioned substantially centrally between the inner and outer flanges. This well will hereinafter be referred to as the central well, despite the fact that the well need not be positioned exactly centrally between the inner and outer flanges. Each bead seat is positioned axially inwardly of the respective flange. Each bead seat includes a substantially straight surface against which a tyre bead is located. Upon inflation of the tyre to its in use pressure, a force is applied to each bead seat and to each flange. Each bead seat has an axially outer end which is attached to the respective flange by a connecting part. Each flange connecting part is a concave portion, and is known in the art as a bead seat radius.

Between each bead seat and the central well is positioned a side part. It is known for the side part to include concave and convex portions, which create 'sub-wells' to form an 'undulating' side part, for example. Each side part is connected to the central well by a respective connecting part. Each of these connecting parts is a concave portion, and will hereinafter be referred to as a well radius. Internationally accepted industry standards, for example the current European Tyre and Rim Technical Organisation (ETRTO) standard, set out certain aspects of wheel design, and criteria which wheel constructions should meet.

It is desirable for tyres to be inflated to a pressure which is as low as possible for a given application, whilst preferably still being able to bear the same load as when inflated to standard pressure for a tyre of the same circumference. Running at a lower air pressure typically improves traction and compaction. For example, Michelin North America offers 'Improved Flexion' tyres, which are able to bear the same load as a standard tyre of the same rolling circumference, at up to 20% lower air pressure, or are able to bear up to 20% more load than a standard tyre of the same rolling circumference, at standard air pressure.

A disadvantage of running at relatively low air pressures is that it is common for tyres inflated to relatively low pressures to slip relative to the rim. A disadvantage of relatively stiff tyres is that they can be awkward to fit to a rim. The advantages of higher traction and reduced compaction provided by running tyres at relatively low pressures can be offset by these disadvantages.

It is an aim of the present invention to ameliorate one or more disadvantages experienced by users of known rims.

According to the present invention, there is provided a wheel construction including a rim, the rim having an inner flange and an outer flange, each of the inner flange and the outer flange having a first end and a second end, the first end of each of the inner and outer flange being positioned axially outwardly relative to the second end of the respective flange, the rim further including a central well positioned between the inner flange and the outer flange, a pair of bead seats, one being positioned adjacent each flange, each bead seat having an axially outer end which is connected to a second end of the respective flange by a flange connecting portion, and an axially inner end which is connected to one of a pair of side parts, each side part being positioned between the central well and one of the inner flange and outer flange, and connected to the central well by a well connecting portion, the axially outer end of each bead seat being positioned radially outwardly relative to the axially inner end of the respective bead seat, wherein at least one of the inner flange and the outer flange includes an extended portion which extends radially inwardly, such that a free end of the extended portion is positioned radially inwardly relative to the first end of the respective flange, and wherein at least one of the side parts includes a substantially straight portion and a curved portion, a first end of the straight portion being positioned adjacent the respective bead seat, and connected to the respective bead seat by a curved connecting portion, and a second end of the straight portion being connected to the curved portion of the side part by a first substantially concave surface to provide a first sub-well, and the curved portion of the side part including a second sub-well, which is defined by a pair of convex surfaces, separated by a second concave surface.

Each flange connecting portion may include a substantially concave surface.

Each flange connecting portion may include a substantially straight surface.

The extended portion may be substantially straight.

The radial extent of the extended portion may be substantially equal to the radial extent of the respective flange connecting portion.

At least one of the flanges may include a convex surface.

The free end of the or each extended portion may lie axially outwardly relative to the radial peak of the convex surface of the respective flange.

The free end of the or each extended portion may lie substantially axially aligned with the first end of the respective flange.

The free end of the or each extended portion may lie substantially axially outwardly relative to the first end of the respective flange.

The free end of the or each extended portion may lie axially inwardly relative to a radial peak of the convex surface of the respective flange.

The free end of the or each extended portion may lie axially inwardly relative to the first end of the respective flange.

At least one of the well connecting portions may include a concave surface.

The pair of side parts may be substantially identical to one another, albeit a mirror image of one another about a substantially radially extending plane.

The rim may be substantially symmetrical.

At least one of the curved connecting portions which connects each bead seat to the adjacent side part may include a concave surface.

The wheel construction may further include a disc which is attachable to the rim.

According to a second aspect of the invention, there is provided a vehicle including a wheel construction according to any of the preceding claims.

The present invention will now be described by way of example only, with reference to the accompanying drawings, of which:

Figure 2A:
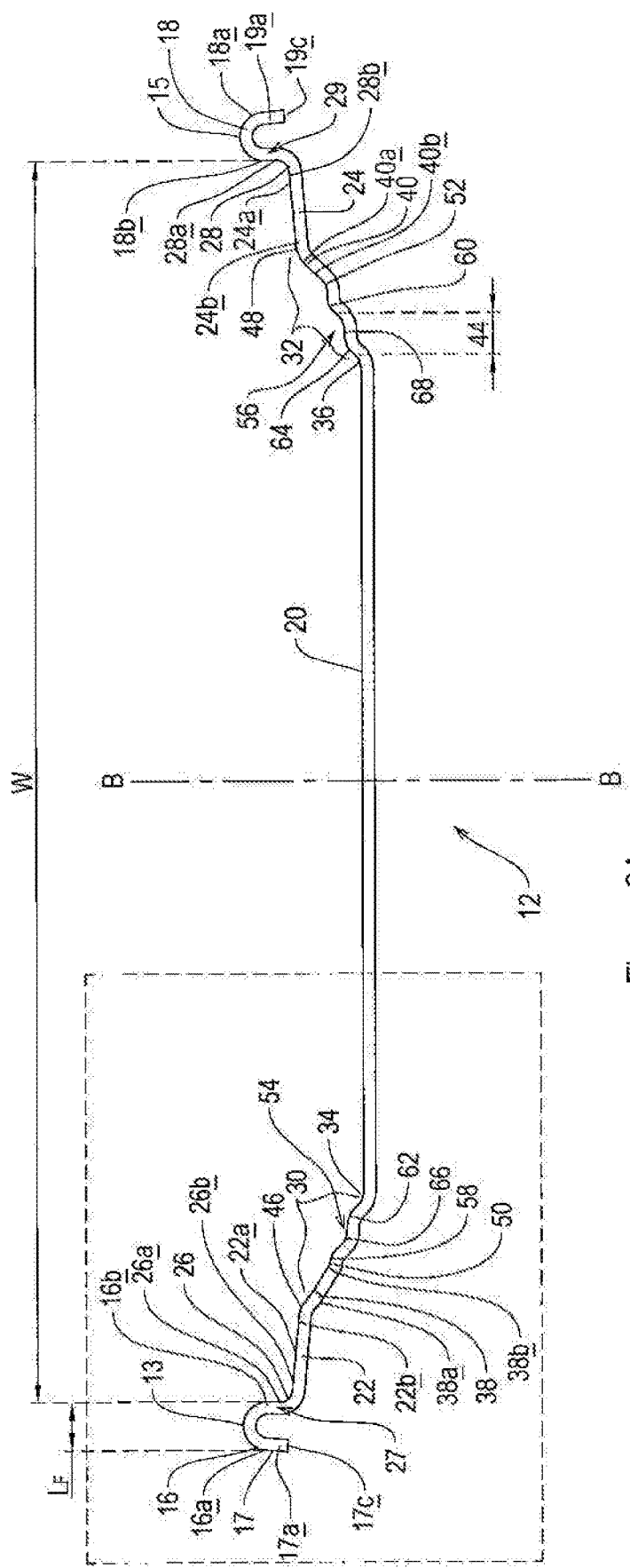
FIG. 2A is a cross-sectional view of a part of the wheel rim of FIG. 1.
Figure 2B:
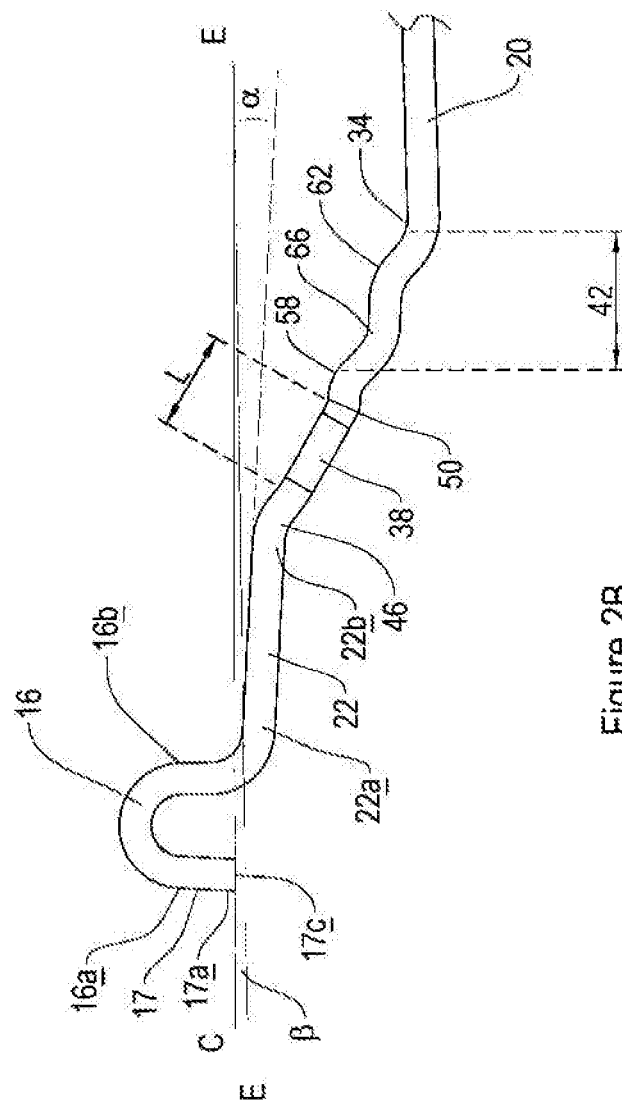

FIG. 2B an enlarged view of a part of FIG. 2A as indicated by dotted lines in FIG. 2A.

Referring to the figures, there is shown a wheel construction 10 which includes a rim 12. The wheel construction 10 also includes a disc 14 which is connected to the rim 12. In the example shown, the disc 14 is permanently connected to the rim 12, for example by welding, but it will be appreciated that the disc 14 may, alternatively, be detachable from the rim 12. The disc 14 enables the wheel construction 10 to be attached to a hub or an axle of a vehicle. Features of the disc 14, for example its shape and attachment formations, are typical in nature. It will be appreciated that other forms of disc 14 may be suitable and appropriate.

Figure 1:
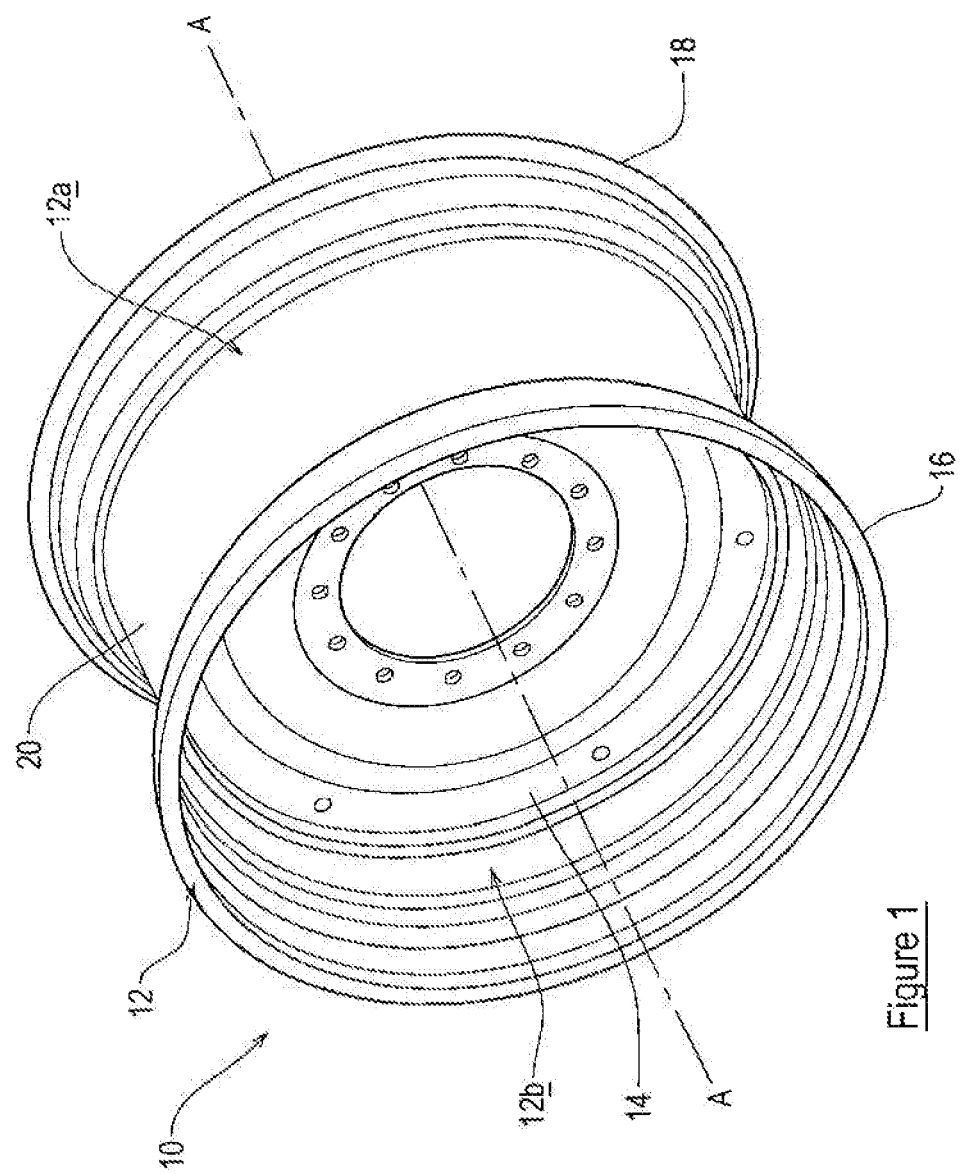
FIG. 1 is a perspective view of a wheel construction.

The rim 12 is substantially circular, having a radially outer surface 12a (commonly referred to as a tyre-side 12a), upon which, in use, a tyre is fitted, and a radially inner surface 12b (commonly referred to as a weather side 12b), to a part of which the disc 14 is attached. The rim has an axis A, which is substantially central. When used herein, the term 'axial' is defined as being generally parallel to the axis A (shown as a dashed line in FIG. 1). When used herein, the term 'radial' is defined as being generally perpendicular to the central axis A. The terms 'inwardly' and outwardly' when used herein are used to describe axial positions, with 'inwardly' meaning closer to an axially central plane, and 'outwardly' meaning further from the axially central plane B (shown by a dashed line in FIG. 2A).

The rim 12 includes an inner flange 16, an outer flange 18, and a central well 20 positioned between the inner flange 16 and the outer flange 18. Each flange has a first end 16a, 18a, and a second end 16b, 18b. In an embodiment, at least one of the inner flange 16 and the outer flange 18 includes a convex surface 13, 15, i.e. the or each flange 16, 18 has an externally radiused portion on the tyre side 12a. The radius of curvature of the convex surface 13, 15 of the or each flange 16, 18 may be approximately 15 mm±2 mm. A peak of the convex surface 13, 15 of at least one of the flanges 16, 18 may define the greatest radial extent of the rim 12. Each flange 16, 18 has an axial length $L_F$.

The central well 20 is a substantially cylindrical portion of the rim 12, with both its tyre side and its inner surface being substantially straight in cross section. The central well 20 may have a substantially constant radius along its whole axial extent.

The rim 12 also includes a pair of bead seats 22, 24, one being positioned adjacent each flange 16, 18. Each bead seat 22, 24 has a first end 22a, 24a, which is connected to the second end 16b, 18b of the respective flange 16, 18 by a respective flange connecting portion 26, 28, and a second end 22b, 24b which is connected to one of a pair of side parts 30, 32, of the rim 12. The first end 22a, 24a of each bead seat 22, 24 is located axially outwardly relative to the respective second end 22b, 24b. The first, axially outer end 22a, 24a is positioned radially outwardly relative to the respective second, axially inner end 22b, 24b. The tyre side and inner surface of each bead seat 22, 24 are substantially straight in cross-section, such that each bead seat 22, 24 is substantially frustoconical.

The or each flange connection portion 26, 28 has a first end 26a, 28a, which is adjacent the second end 16b, 18b of the respective flange 16, 18, and a second end 26b, 28b which is adjacent the respective bead seat 22, 24. The or each flange connection portion 26, 28 includes a concave surface, i.e. the tyre side of the or each flange connection portion 26, 28 is internally radiused. The radius of curvature of the concave surface of the or each flange connection portion 26, 28 may be approximately 8 mm. The or each flange connection portion 26, 28 may also include a substantially straight surface 27, 29, on its tyre side, at least. In such an embodiment, the concave surface is positioned at the second end 26b, 28b, adjacent with and joining the respective bead seat 22, 24, and the respective substantially straight surface 27, 29 is positioned at the first end 26a, 28a, adjacent and joining with the respective flange 16, 18. The straight surface 27, 29 of the or each flange connection portion 26, 28 may extend in a substantially radial direction. The radial length of the substantially straight surface 27, 29 of the or each flange connection portion 26, 28 may be between approximately 1 mm and 10 mm, and may be approximately 2.5 mm or approximately 6 mm, depending upon the overall size of the wheel.

The rim 12 includes a pair of side parts 30, 32, each being positioned between the central well 20 and one of the inner flange 16 and outer flange 18. Each side part 30, 32 is connected to the central well 20 by a respective well connecting portion 34, 36. In an embodiment, at least one of the well connecting portions 34, 36 includes a concave surface, i.e. the tyre side of the or each well connecting portion 34, 36 includes an internally radiused surface. Both well connecting portions 34, 36 may include a concave surface. The radius of curvature of the or each well connecting portion 34, 36 may be approximately 15 mm±2 mm.

At least one of the side parts 30, 32 includes a substantially straight portion 38, 40 and a curved portion 42, 44. A first end 38a, 40a of the or each straight portion 38, 40 is positioned adjacent the respective bead seat 22, 24, and is connected to the second end 22b, 24b of the respective bead seat 22, 24 by a curved connecting portion 46, 48. The or each curved connecting portion 46, 48 may include a convex surface, i.e. the tyre side of the or each curved connecting portion 46, 48 may be externally radiused. The radius of curvature of the curved connecting portion 46, 48 may be 16 mm±2 mm. A second end 38b, 40b of the or each straight portion 38, 40 is connected to the respective curved portion 42, 44 of the side part 30, 32 by a first substantially concave surface 50, 52, i.e. the tyre side of first substantially concave surface may be internally radiused. The radius of curvature of the or each first substantially concave surface 50, 52 may be 15 mm±2 mm. The first substantially concave surface 50, 52 provides a first 'sub-well', positioned between the central well 20 and the respective bead seat 22, 24.

The curved portion 42, 44 of one or both of the side parts 30, 32 may include a second sub-well 54, 56, which is defined by a pair of convex surfaces 58, 60, 62, 64, separated by a second concave surface 66, 68. The tyre side of each of the convex surfaces 58, 60, 62, 64 includes an externally radiused portion, and the tyre side of each of the second concave surfaces 66, 68 includes an internally radiused portion. The radius of curvature of each convex surface 58, 60, 62, 64 may be approximately 16 mm±2 mm. The radius of curvature of the or each second concave surface 66, 68 may be 15 mm±2 mm. It will be appreciated that one or both of the side parts 30, 32 may be provided with a second sub-well 54, 56.

At least one of the inner flange 16 and the outer flange 18 includes an extended portion 17, 19 which extends radially inwardly from the first (axially outward) end 16a, 18a of the respective flange 16, 18, such that at least a part of a free end 17a, 19a of the or each extended portion 17, 19 is positioned radially inwardly relative to the second end 16b, 18b, of the respective flange 16, 18. The or each extended portion 17, 19 may include a substantially straight surface, and may be substantially straight along its entire length. The or each extended portion 17, 19 extends in a generally radially inward direction.

The free end 17a, 19a of the or each extended portion may lie axially outwardly relative to the radial peak of the convex surface 13, 15 of the respective flange 16, 18. It will be appreciated that even if the or each flange 16, 18 does not include a convex surface, the free end 17a, 19a of the or each extended portion 17, 19 may extend axially outwardly from a most radially outwardly positioned portion of the respective flange 16, 18. The or each free end 17a, 19a may lie substantially axially aligned with the first end 16a. 18a of the respective flange 16, 18 or may lie substantially axially outwardly relative to the first end 16a, 18a of the respective flange 16, 18.

Alternatively, The free end 17a, 19a of the or each extended portion 17, 19 may lie axially inwardly relative to the radial peak of the convex surface 13, 15 of the respective flange 16, 18, or where the respective flange does not include a convex surface, the free end 17a, 19a of the or each extended portion 17, 19 may lie axially inwardly relative to a most radially outwardly positioned portion of the respective flange 16, 18.

The free end 17a, 19a of the or each extended portion 17, 19 may have a substantially flat end face 17c, 19c. The or each end face 17c, 19c may be substantially parallel with the respective bead seat 22, 24. An angle 13 between the or each face 17c, 19c, and a plane E which is parallel to the axis A of the rim 12 may be between 0° and 45° and is preferably between 0° and 10°, and more preferably between approximately 4° and 6° and may be approximately 5°. This is illustrated in FIG. 2R which shows a cross-section through the rim 12, taken through a plane which extends substantially radially, from the axis A in a single radial direction. In FIG. 2B, the angle β is the angle subtended above the plane E. It will be appreciated that the orientation of the or each end face 17c, 19c may be such that the angle 3 is subtended below the plane E, and may be given a '-' (minus or negative) notation. In other words, the angle β may be between 0° and approximately ±45°, more preferably between 0° and approximately ±10°, and is more preferably approximately ±5°. The angle β will tend to be 'negative', i.e. subtended below the plane E, in an embodiment where the free end 17a, 19a of the or each extended portion 17, 19 is positioned radially inwardly relative to the axially inwardly relative to the most radially outwardly positioned portion of the respective flange 16, 18 or the radial peak of the convex surface 13, 15 of the respective flange 16, 18.

The angle a between the bead seat 22 and the plane E which is parallel to the axis A is approximately 5°±1°.

The or each extended portion 17, 19 may extend the respective flange 16, 18 radially beyond the radial position of the first end 22a of the respective bead seat 22, 24. The or each end face 17c, 19c may be substantially parallel with the respective bead seat 22, 24. The length of the or each extended portion 17, 19 may be between approximately 0.1 mm and approximately 15 mm and may be 12 mm, for example.

Knurling may be provided on the tyre side 12a of the rim 12. For example, knurling may be provided on at least a part of at least one of the bead seats 22, 24. Standard knurling, which is typically used in the art is preferable to a relatively high amount of knurling, or deep knurling, as this reduces the likelihood of damage to the tyre in the event that the tyre slips circumferentially relative to the rim during fitting or during driving of a vehicle to which the rim 12 and the corresponding tyre are fitted. The combination of the extended portions 17, 19 in combination with the shape of the profile of the rim, in particular the shape of the or each side part 30, 32 avoids the need to provide additional and/or deep knurling to achieve reduced incidences of tyre slippage compared to known rim profiles.

The examples of sizes, including lengths and radii, provided in this specification are in relation to a rim 12 having a nominal rim width W of approximately 762 mm. It will be appreciated that corresponding sizes for rims 12 of differing nominal widths may have to be factored appropriately.

The invention, in particular the profile of the or each side part 30, 32 of the rim 12, facilitates the tyre mounting process, particularly on high load capacity tyres and/or low pressure tyres, which typically have stiff tyre walls, which reduces the risk of damage to the tyre during fitting on the rim 12.

When a tyre which is being fitted to the rim 12 is inflated, during the mounting process, a low pressure is used, for safety reasons. The profile of the rim 12, particularly the features of the or each side part 30, 32, facilitates movement of a bead of the tyre in a generally axial direction towards each bead seat 22, 24, and inhibits the or each bead of the tyre from 'sticking' on the respective side part 30, 32. The profile of the rim 12, in particular the shape of the or each side part 30, 32 reduces stress in the rim 12.

The profile of the rim 12, in particular the extended portions 17, 19 of the or each flange 16, 18 provides increased stiffness of the rim 12, particularly in the region of the rim 12 near to the or each flange 16, 18. The increased stiffness of the rim 12 means that the rim 12 is less likely to yield under the load of the tyre, making the rim 12 advantageous for high load capacity applications, which typically require stiffer tyres. The increased stiffness, and lower likelihood of yielding leads to increased surface pressure between the rim 12 and the corresponding tyre. In turn this leads to greater friction between the rim 12 and the tyre, and less likelihood of slippage of the tyre generally circumferentially relative to the rim 12.

The inclusion of the or each extended portion 17, 19 minimises, or at least reduces shrinkage of the rim during tyre mounting and/or inflation. This provides a more consistent rim profile.

The rim 12 is particularly advantageous in reducing generally circumferential slipping of a corresponding tyre relative to the rim 12 for high traction, low pressure tyres. The profile of the rim 12, in particular the shape of the of each side part 30, 32 is advantageous in the mounting of relatively stiff, high load capacity tyres the use of which is facilitated, at least in part, by the provision of the extended portions 17, 19 of the or each flange 16, 18. The profile of the rim including three concave formations (i.e. wells) is that during fitting, a tyre is encouraged to slide directly to the well connecting portion 34, 36 or 'rim well' and the risk of the tyre 'sticking' on the side part, particularly when mounting a second side of the tyre. This ensures that the full diagonal mounting distance is used, to reduce the risk of damaging the tyre.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A wheel construction for mounting a high load capacity tire, wherein the wheel construction and high load capacity tire are adapted for use in combination with an off road vehicle, the wheel construction including a rim, the rim having an inner flange and an outer flange, each of the inner flange and the outer flange having an arcuate configuration defining a first end and a second end, the first end of each of the inner and outer flange being positioned axially outwardly relative to the second end of the respective flange, the rim further including a central well positioned between the inner flange and the outer flange, a pair of bead seats, one being positioned adjacent each flange, each bead seat having an axially outer end which is connected to a second end of the respective flange by a flange connecting portion, the flange connecting portion including a substantially concave surface and a substantially straight surface extending radially outwardly therefrom, wherein the substantially concave surface and the substantially straight surface are configured to engage surfaces of the high load capacity tire mounted to the rim, wherein the substantially straight surface is adjacent to and adjoins the second end of the respective flange, and each bead seat also having an axially inner end which is connected to one of a pair of side parts, each side part being positioned between the central well and one of the inner flange and outer flange, and connected to the central well by a well connecting portion, the axially outer end of each bead seat being positioned radially outwardly relative to the axially inner end of the respective bead seat, wherein at least one of the inner flange and the outer flange includes an extended portion which extends radially inwardly from the first end of the flange, wherein the extended portion defines a free end that is positioned in its entirety radially inwardly relative to the first end and to the second end of the respective flange and radially inwardly of the location at which the second end of the flange adjoins the substantially straight surface of the flange connecting portion, and wherein at least one of the side parts includes a substantially straight portion and a curved portion, a first end of the straight portion being positioned adjacent the respective bead seat, and connected to the respective bead seat by a curved connecting portion, and a second end of the straight portion being connected to the curved portion of the side part by a first substantially concave surface to provide a first sub-well, and the curved portion of the side part including a second sub-well, which is defined by a pair of convex surfaces, separated by a second concave surface.

2. The wheel construction according to claim 1 wherein the extended portion is substantially straight.

3. The wheel construction according to claim 1 wherein the radial extent of the extended portion is substantially equal to the inward radial extent of the straight portion of the respective flange connecting portion.

4. The wheel construction according to claim 1 wherein at least one of the flanges includes a convex surface.

5. The wheel construction according to claim 4 wherein the free end of the or each extended portion lies axially outwardly relative to a radial peak of the convex surface of the respective flange.

6. The wheel construction according to claim 1 wherein the free end of the or each extended portion lies substantially axially aligned with the first end of the respective flange.

7. The wheel construction according to claim 1 wherein the free end of the or each extended portion lies substantially axially outwardly relative to the first end of the respective flange.

8. The wheel construction according to claim 1 wherein at least one of the well connecting portions includes a concave surface.

9. The wheel construction according to claim 1 wherein the pair of side parts are a mirror image of one another about a substantially radially extending plane.

10. The wheel construction according to claim 1 wherein the rim is substantially symmetrical.

11. The wheel construction according to claim 1 wherein at least one of the curved connecting portions which connects each bead seat to the adjacent side part includes a concave surface.

12. The wheel construction according to claim 1, and further including a disc which is attachable to the rim.

13. A wheel construction for mounting a high load capacity tire, wherein the wheel construction and high load capacity tire are adapted for use in combination with an off road vehicle, the wheel construction including a rim, the rim having an inner flange and an outer flange, each of the inner flange and the outer flange having an arcuate configuration defining a first end and a second end, the first end of each of the inner and outer flange being positioned axially outwardly relative to the second end of the respective flange, the rim further including a central well positioned between the inner flange and the outer flange, a pair of bead seats, one being positioned adjacent each flange, each bead seat having an axially outer end which is connected to a second end of the respective flange by a flange connecting portion, the flange connecting portion including a substantially concave surface and a substantially straight surface extending radially outwardly therefrom, wherein the substantially concave surface and the substantially straight surface are configured to engage surfaces of the high load capacity tire mounted to the rim, wherein the substantially straight surface is adjacent to and adjoins the second end of the respective flange, and each bead seat also having an axially inner end which is connected to one of a pair of side parts, each side part being positioned between the central well and one of the inner flange and outer flange, and connected to the central well by a well connecting portion, the axially outer end of each bead seat being positioned radially outwardly relative to the axially inner end of the respective bead seat, wherein at least one of the inner flange and the outer flange includes an extended portion which extends radially inwardly from the first end of the flange, wherein the extended portion defines a free end that is positioned radially inwardly relative to the first end and to the second end of the respective flange, wherein the free end of the extended portion defines a substantially flat end face, wherein the substantially flat end face defines an angle of between approximately 4° and 6° relative to a plane which is parallel to the axis of the rim, wherein at least one of the side parts includes a substantially straight portion and a curved portion, a first end of the straight portion being positioned adjacent the respective bead seat, and connected to the respective bead seat by a curved connecting portion, and a second end of the straight portion being connected to the curved portion of the side part by a first substantially concave surface to provide a first sub-well, and the curved portion of the side part including a second sub-well, which is defined by a pair of convex surfaces, separated by a second concave surface.

14. The wheel construction according to claim 13 wherein the free end of the extended portion is located inwardly of the location at which the second end of the flange adjoins the substantially straight surface of the flange connecting portion.

15. The wheel construction according to claim 14 wherein the radial extent of the extended portion is substantially equal to the inward radial extent of the straight portion of the respective flange connecting portion.

16. The wheel construction according to claim 13 wherein the free end of the or each extended portion lies axially outwardly relative to a radial peak of the convex surface of the respective flange.

17. The wheel construction according to claim 13 wherein the free end of the or each extended portion lies substantially axially aligned with the first end of the respective flange.

18. The wheel construction according to claim 13 wherein at least one of the well connecting portions includes a concave surface.

19. The wheel construction according to claim 13 wherein at least one of the curved connecting portions which connects each bead seat to the adjacent side part includes a concave surface.

20. The wheel construction according to claim 13, and further including a disc which is attachable to the rim.

* * * * *